April 5, 1949.  B. M. COOK  2,466,384
AUXILIARY SPRING FOR MOTOR VEHICLES
Filed May 2, 1947
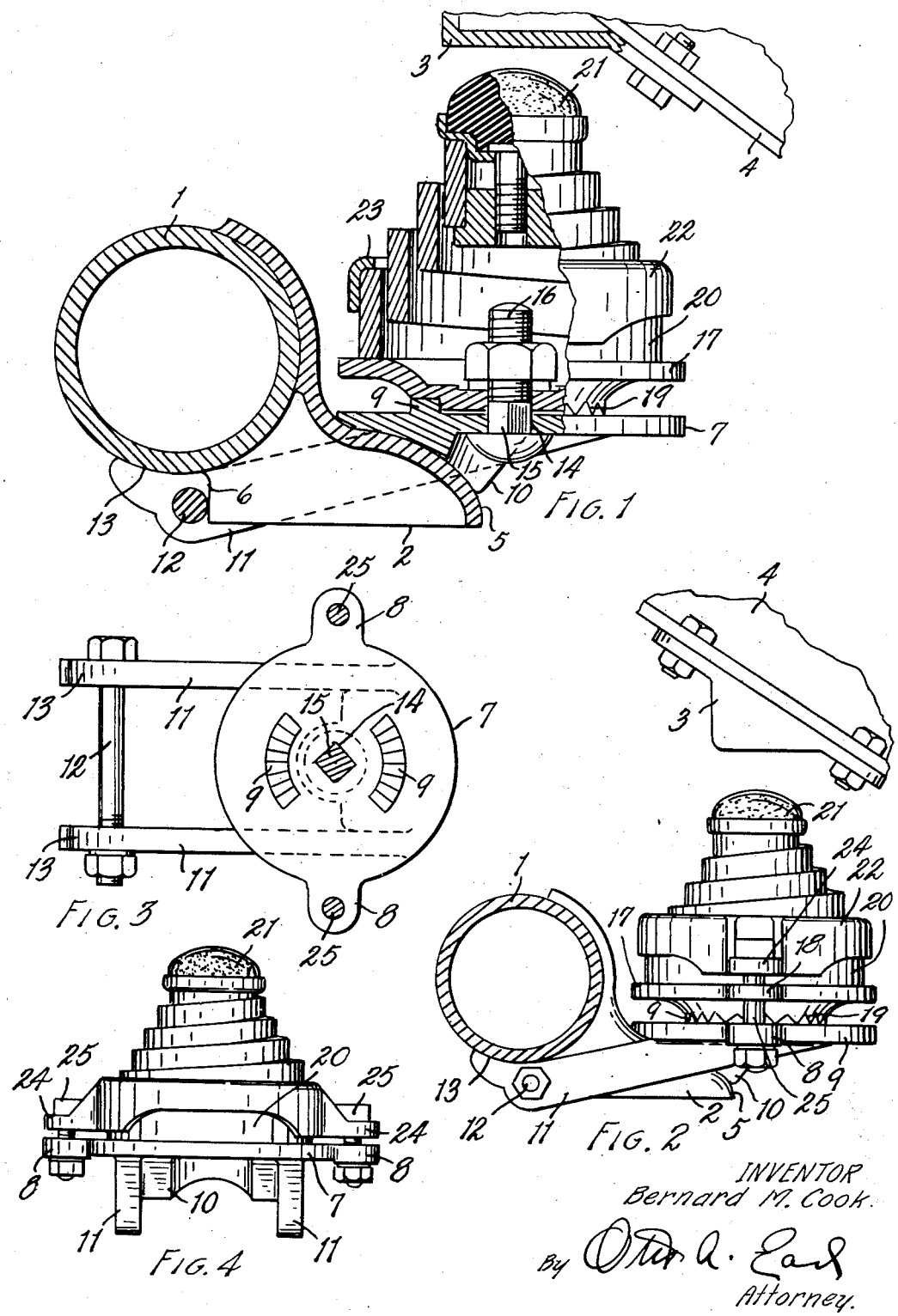
INVENTOR
Bernard M. Cook.
Attorney.

Patented Apr. 5, 1949

2,466,384

UNITED STATES PATENT OFFICE 2,466,384

AUXILIARY SPRING FOR MOTOR VEHICLES

Bernard M. Cook, Detroit, Mich.

Application May 2, 1947, Serial No. 745,362

9 Claims. (Cl. 267—22)

This invention relates to improvements in an auxiliary spring for motor vehicles.

The principal objects of this invention are:

First, to provide an auxiliary spring for a motor vehicle which may be easily mounted upon a bracket secured to the axle housing of the vehicle.

Second, to provide a novel form of auxiliary spring base adapted to lockingly engage and be supported on a bracket secured to the axle housing of a motor vehicle.

Third, to provide means for eccentrically mounting an auxiliary spring on the axle housing of a motor vehicle in which the height of the spring may be readily adjusted.

Other objects and advantages pertaining to the details and economies of the invention will be apparent from the following description and claims:

The drawings, of which there is one sheet, illustrate a preferred form of my spring and mounting and one modified arrangement thereof.

Fig. 1 is a fragmentary vertical longitudinal cross sectional view through my spring as mounted on the axle housing of a motor vehicle.

Fig. 2 is a fragmentary elevational view similar of Fig. 1.

Fig. 3 is a plan view of the spring supporting base shown in Figs. 1 and 2.

Fig. 4 is a front elevational view of a modified method of mounting the spring on my base.

The spring and mounting structure shown in the present application is a specialized form of the spring and spring mount described and claimed in my copending application Ser. No. 740,545, filed April 10, 1947, for Auxiliary springs for motor vehicles. Motor vehicles, particularly passenger vehicles, are equipped with springs designed to cushion the weight of the vehicle when operating under standard loading conditions. Quite frequently, however, extraordinary loads are placed on the vehicles as when heavy trailers are attached to them in which case the springs provided by the manufacturer are too weak or soft to support the added load without causing the frame and body to bump against the axle housing. It has therefore been the practice to mount auxiliary springs on the axle so that when the body and frame are deflected by an extra heavy load the frame will come in contact with the auxiliary spring to support the extra load. The auxiliary springs have no connection to the frame and support the frame solely by bearing against the under side of the frame when the vehicle is under heavy load.

Some vehicles are provided with brackets on the rear axle housing which are arranged to engage limiting bumpers secured to the frame of the vehicle to limit the amount of deflection in the regular springs of the vehicle. It is my present invention to provide a base and spring which may be easily and securely clamped to one of these brackets to cooperate with the bumper portion of the frame of the vehicle to increase the load which may be carried by the vehicle.

The drawings illustrate the rear axle housing 1 of a vehicle having forwardly extending brackets 2 secured thereto and positioned underneath bumper members 3 secured to the under side of the frame 4 of the vehicle. It will be understood that identical brackets and bumpers are provided on each side member of the frame 4 but for the purpose of brevity only one side of the vehicle is illustrated. The bracket 2 is of downwardly opening channel-shaped cross section and is provided with a forwardly and downwardly curved upper surface 5. The lower edges of the side flanges of the bracket extend below the axle housing 1 and terminate in rearwardly facing edges 6 approximately under the center of the axle housing. These brackets and limit bumpers are standard equipment on some automobiles and form no part of the present invention except as they form supports for and cooperate with my base indicated at 7.

The base 7 is generally circular in outline having a pair of laterally extending apertured ears 8 formed on the sides thereof and being provided with radially disposed serrations 9 on the upper surface thereof. The under side of the bracket 7 is thickened and shaped as at 10 to conform to and smoothly engage the upper surface of the bracket 2. Each side of the base 7 is provided with rearwardly extending arms 11, the rear ends of which are apertured to receive a tie bolt 12. The upper surface of the rear ends of the arms 11 is curved upwardly as at 13 to smoothtly engage the under side of the axle housing 1. The arms 11 are of such a length that when the formed portion 10 of the base is resting upon the bracket 2 the upwardly curved surfaces 13 will engage the under side of the axle housing and the tie bolt 12 will engage the rear edges 6 of the bracket flanges. The base plate is thus easily and securely fastened to the bracket 2.

The base plate 7 defines a rectangular aperture 14 centered within the radial serrations 9 and arranged to receive the squared shank 15 of a carriage bolt 16. Positioned on top of the base plate 7 is a table member 17 which is generally circular in outline and provided with apertured ears 18 arranged to be aligned with the ears 8 on the base member. The center of the table member is dished downwardly and has serrations 19 arranged to engage the serrations 9 on the upper surface of the base member to hold the table member against rotation on the base member. The center of the table member defines an aperture for passing the carriage bolt 16 and is arranged to be clamped to the base member by means of a nut and lock washer on the bolt 16.

The upper and outer portion of the table 17 is arranged to support the lower turn of a volute spring 20 which is formed of converging turns of flat spring material. The upper or smallest turn of the spring 20 is provided with a rubber bumper 21 arranged to engage and yieldingly support the bumper portion 3 of the frame 4 and a retaining ring 22 is provided for clamping the spring 20 to the table member 17. The retaining ring 22 is generally annular in shape being provided with an inturned flange 23 around the upper edge thereof engageable over the top of the lower turn of the spring. The retaining ring is further provided with laterally extending ears 24 arranged to be aligned with the ears 8 and 18 on the base and table member respectively so that the bolts 25 may be passed therethrough for clamping the spring, table member and base member securely together.

With the base member clamped to the bracket 2 as previously described, the spring 20 and retaining ring 22 may be easily clamped to the base member or the auxiliary spring and base may be completed as a unit and later attached to the bracket 2. In this position the spring is adapted to engage the bumper portion 3 of the frame after main springs of the vehicle have been partially deflected by an extra heavy load. Engagement between the bumper 21 and bumper portion 3 acts to assist the main springs in supporting the increased weight of the vehicle on the axle housing 1.

Fig. 4 represents a modified manner of mounting the spring and retaining ring on the base member 7. It will be noted that the table member 17 has been omitted from the structure shown in Fig. 4 so that the spring member 20 will be positioned lower on the axle and will not engage the bumper portion 3 of the frame until the main springs of the vehicle have been deflected a greater distance by a proportionately greater load. In other respects the spring and spring mounting structure as shown in Fig. 4 is the same as in the preferred form of my spring.

By mounting my spring on the axle housing by either of the methods illustrated above, the frame and body of the vehicle is supported when in lightly loaded condition solely by the regular springs of the vehicle to provide a smooth, lightly cushioned ride. However, as extra heavy loads are applied to the vehicle frame the auxiliary spring will come into operation to assist the main spring in supporting these loads.

I have thus described a highly practical commercial embodiment of my spring so that others may reproduce the same with such minor modifications as are desired without departing from the theory of my invention.

Having thus described my invention, what I claim as new and desired to secure by Letters Patent, is:

1. Auxiliary spring structure for a motor vehicle having an axle housing with a downwardly and forwardly extended bracket secured thereto and having a depending edge comprising a base member having rearwardly extending arms on the underside thereof, the underside of said base being shaped to conform to and resting on said bracket with said arms extending on each side thereof, the upper edges of the ends of said arms being shaped to conform to and engaging the under side of said housing, a tie bolt extending between said arms and engaging the rear depending edge of said bracket, a plurality of radially exending serrations formed on the upper side of said base, said base defining a flat sided aperture centered between said serrations, a table member having a downwardly dished center section with a plurality of radially extending serrations formed on the under side thereof and engaging said serrations on said base, a bolt extending through said aperture and table clamping said base plate and table together, a volute spring made of strip stock with overlapping turns having its base supported on said table, an annular retainer member having an inturned flange engaging the top and sides of the lower turn of said spring, ears formed on the opposite sides of said retainer, table and base member, bolts extending through said ears clamping said members together, and a deformable bumper member carried on the upper turn of said spring and arranged to engage a portion of the frame of the vehicle for cushioning said frame on said axle.

2. Auxiliary spring structure for a motor vehicle having an axle housing with a downwardly and forwardly extended bracket secured thereto and having a depending edge comprising a base member having rearwardly exending arms on the underside thereof, the underside of said base being shaped to conform to and resting on said bracket with said arms extending on each side thereof, the upper edges of the ends of said arms being shaped to conform to and engaging the underside of said housing, a tie bolt extending between said arms and engaging the rear depending edge of said bracket, a plurality of radially extending serrations formed on the upper side of said base, a table member with a plurality of radially extending serrations formed on the underside thereof and engaging said serrations on said base, a bolt clamping said base plate and table together, a volute spring having its base supported on said table, an annular retainer member having an inturned flange engaging the top and sides of the lower turn of said spring, ears on the opposite sides of said retainer, table and base member, bolts extending through said ears clamping said members together, and a bumper member carried on the upper turn of said spring and arranged to engage a portion of the frame of the vehicle for cushioning said frame on said axle.

3. Auxiliary spring structure for a motor vehicle having an axle housing with a downwardly and longitudinally extended bracket secured thereto and having a depending edge comprising a base member having longitudinally extending arms on the underside thereof, the underside of said base being shaped to conform to and resting on said bracket with said arms extending on each side thereof, a tie bolt extending between said arms and engaging the depending edge of said bracket, a plurality of radially extending serrations formed on the upper side of said base, a table member with a plurality of radially extending serrations formed on the underside thereof and engaging said serrations on said base, a bolt clamping said base plate and table together, a volute spring having its base supported on said table, an annular retainer member having an inturned flange engaging the top and sides of the lower turn of said spring, ears on the opposite sides of said retainer, table and base member, bolts extending through said ears clamping said members together, and a bumper member carried on the upper turn of said spring and arranged to engage a portion of the frame of the vehicle for cushioning said frame on said axle.

4. In combination with a motor vehicle having an axle housing, said axle housing having a forwardly and downwardly sloping bracket secured thereto and having a depending edge extending below the lower surface thereof, an auxiliary spring structure comprising a base having a generally circular outline with apertured ears extending from the opposite sides thereof, the under surface of said base being thickened and shaped to conform to and resting upon the upper surface of said bracket, rearwardly and downwardly extending arms formed on said base, and having upwardly curved rear ends engaging the underside of said axle housing, the rear ends of said arms being apertured to receive a tie member along the depending rear edge of said bracket, radially extending serrations formed on the upper surface of said base, a table member having serrations on the underside thereof engaging said serrations on said base and supported on said base, said base defining an aperture centrally of said serrations receiving a bolt for clamping said table to said base, and a volute spring secured to said table member by means of an annular retaining ring bolted to said table member and base.

5. In combination with a motor vehicle having an axle housing, said axle housing having a forwardly and downwardly sloping bracket secured thereto and having a depending edge extending below the lower surface thereof, an auxiliary spring structure comprising a base having apertured ears extending from the opposite sides thereof, the under surface of said base being thickened and shaped to conform to and resting upon the upper surface of said bracket, rearwardly and downwardly extending arms formed on said base and having rear ends engaging the underside of said axle housing, the rear ends of said arms being apertured receiving a tie member along the depending rear edge of said bracket, a table member supported on said base, said base defining an aperture receiving a bolt clamping said table to said base, and a volute spring secured to said table member by means of an annular retaining ring bolted to said table member and base.

6. In combination with a motor vehicle having an axle housing, said axle housing having a longitudinally and downwardly sloping bracket secured thereto and having a depending edge extending below the lower surface thereof, an auxiliary spring structure comprising a base seated upon the upper surface of said bracket, longitudinally and downwardly extending arms formed on said base and having ends engaging the underside of said axle housing, the ends of said arms being apertured receiving a tie member along the depending edge of said bracket, a table member, said base defining an aperture centrally thereof receiving a bolt clamping said table to said base, and a volute spring secured to said table member by means of an annular retaining ring bolted to said table member and base.

7. In combination with a motor vehicle having an axle housing, said axle housing having a longitudinally and downwardly sloping bracket secured thereto and having a depending edge extending below the lower surface thereof, an auxiliary spring structure comprising a base, the under surface of said base being conformed and seated upon the upper surface of said bracket, longitudinally and downwardly extending arms formed on said base and having ends engaging the underside of said axle housing, the ends of said arms being apertured receiving a tie member along the depending edge of said bracket, a table member, and a volute spring secured to said base by means of an annular retaining ring.

8. In combination with a motor vehicle having an axle housing, said axle housing having a forwardly and downwardly sloping bracket secured thereto and having a depending edge extending below the lower surface thereof, an auxiliary spring supporting structure comprising a base, the under surface of said base being seated upon the upper surface of said bracket, rearwardly and downwardly extending arms formed on said base and having upwardly curved rear ends engaging the underside of said axle housing, the rear ends of said arms being apertured receiving a tie member along the depending rear edge of said bracket, radially extending serrations formed on the upper surface of said base, said base defining apertures receiving bolts clamping a volute spring structure to said base.

9. In combination with a motor vehicle having an axle housing, said axle housing having a longitudinally and downwardly sloping bracket secured thereto and having a depending edge extending below the lower surface thereof, an auxiliary spring supporting structure comprising a base, the under surface of said base being seated upon the upper surface of said bracket, longitudinally and downwardly extending arms formed on said base and having ends engaging the underside of said axle housing, the ends of said arms being apertured receiving a tie member along the depending edge of said bracket, said base defining apertures receiving bolts clamping a volute spring structure to said base.

BERNARD M. COOK.

REFERENCES CITED

The following references are of record in the file of this patent:

UNITED STATES PATENTS

| Number | Name | Date |
| --- | --- | --- |
| 1,042,320 | Chapman | Oct. 22, 1912 |
| 1,539,272 | Prescott | May 26, 1925 |
| 2,411,852 | Domine | Dec. 3, 1946 |